United States Patent [19]

Hanson

[11] 4,271,944
[45] Jun. 9, 1981

[54] SINGLE REVOLUTION TORQUE LIMITING CLUTCH

[76] Inventor: Douglas R. Hanson, 1720 - 9th Ave. South, Anoka, Minn. 55303

[21] Appl. No.: 11,393

[22] Filed: Feb. 12, 1979

[51] Int. Cl.³ .......................... F16D 7/00; F16D 27/01
[52] U.S. Cl. .............................. 192/56 L; 64/28 M; 64/29; 192/84 PM
[58] Field of Search .................. 192/56 L, 84 PM, 79, 192/71, 22, 26, 28; 64/28 M, 29, 30 E, 30 R

[56] References Cited

U.S. PATENT DOCUMENTS

| 2,711,237 | 6/1955 | Wylie | 192/33 |
| 3,194,371 | 7/1965 | Rabinow | 192/56 L |
| 3,446,321 | 5/1969 | Nyman | 192/18 |
| 3,643,770 | 2/1972 | Faulds | 192/56 R |
| 3,712,433 | 1/1973 | Thut | 192/33 X |
| 3,837,232 | 9/1974 | Fredell et al. | 64/28 M X |
| 3,974,884 | 8/1976 | Gidlund | 64/28 M X |

FOREIGN PATENT DOCUMENTS

| 554398 | 1/1957 | Italy | 192/71 |
| 908128 | 10/1962 | United Kingdom | 192/84 PM |

*Primary Examiner*—Rodney H. Bonck
*Attorney, Agent, or Firm*—Kinney, Lange, Braddock, Westman and Fairbairn

[57] ABSTRACT

A clutch which is used to couple and drive a pair of co-axial shafts or other rotating members and which is made to release at a desired torque level. The clutch permits the driving member to make a single revolution before there is any torque tending to rotate the driven member. The drive position is an indexed position, and the breakaway torque is controlled by a pair of permanent magnets. After release, a cam is under spring load from a cam divider which tends to rotate the two members of the clutch relative to each other to the reset position. The cam action creates a torque independently of the drive to reset the clutch. Further, the indexing of the clutch to its drive position each time it releases is positive in the present device.

13 Claims, 4 Drawing Figures

U.S. Patent  Jun. 9, 1981  4,271,944
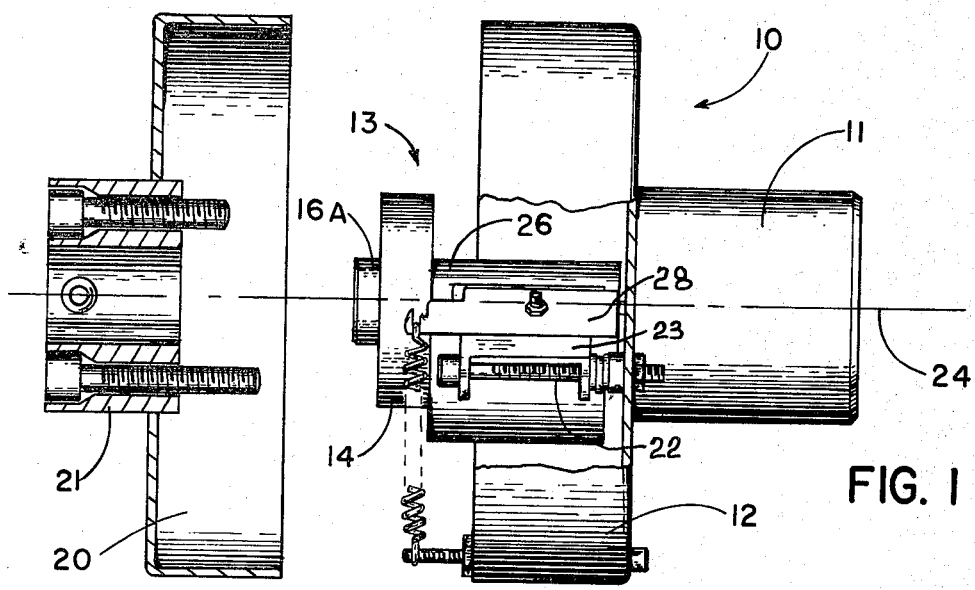
FIG. 1
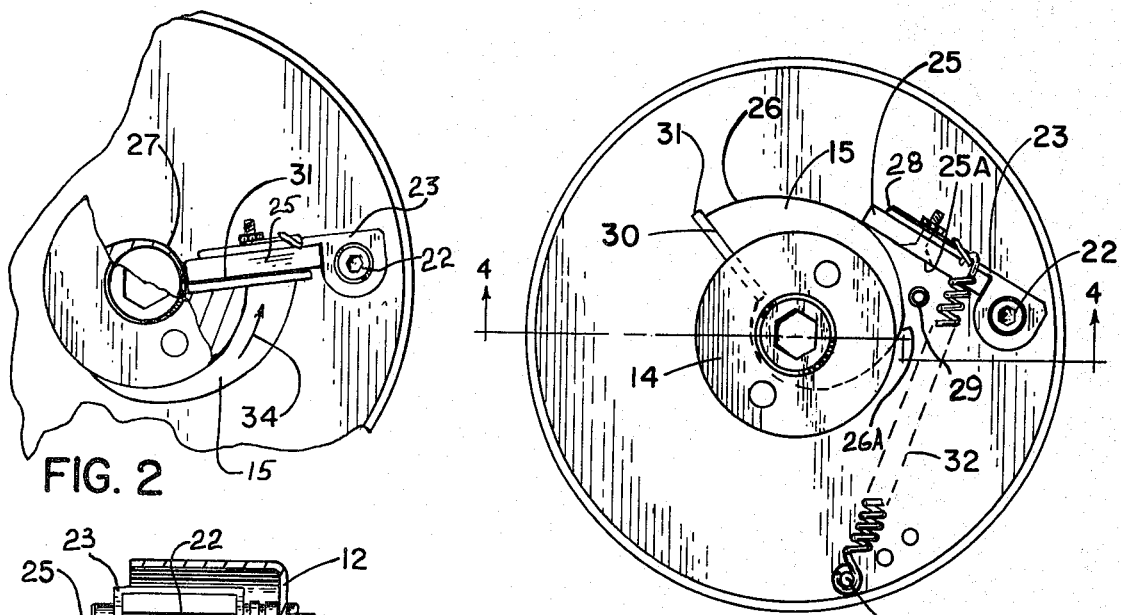
FIG. 2
FIG. 3
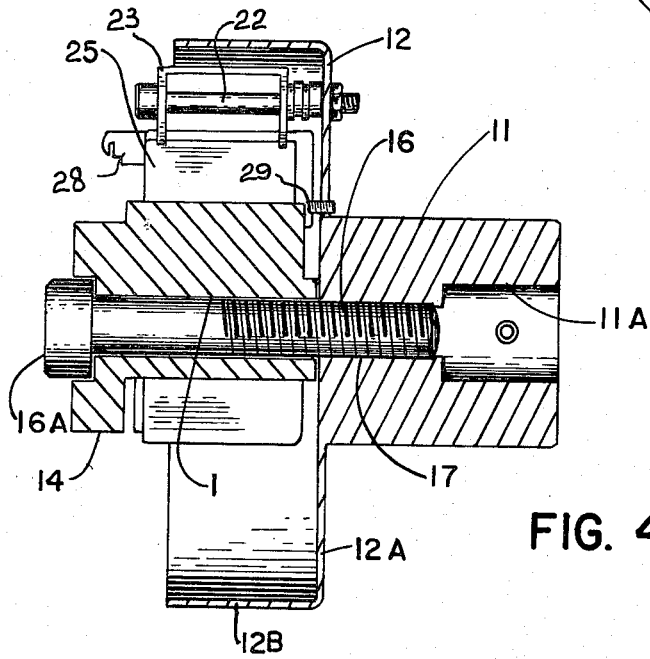
FIG. 4

SINGLE REVOLUTION TORQUE LIMITING CLUTCH

BACKGROUND OF THE INVENTION

1. Field of the Invention

The present invention relates to torque limiting or torque release clutches which provide for a torque tending to reset the clutch to an indexed position after the breakaway torque has been exceeded.

2. Prior Art

In the prior art various types of overload torque clutches have been advanced, and several of these operate on a principle wherein the drive position of the clutch is preset at an indexed position between the drive and driven portions. Such a device is shown in U.S. Pat. No. 3,643,770. The clutch in that patent is a dog type overload torque clutch with fingers that release under excessive load. The drive and driven parts then rotate to a position wherein the stops again engage.

Many types of magnetic clutches have also been advanced wherein magnets on the drive and driven members are annular and face each other, and limit the torque transmitted to the magnetic force. However, such clutches do not have a positive indexed position between the drive and driven members, and thus operate much like ordinary friction clutches. Typical showings of such magnetic clutches include U.S. Pat. Nos. 3,837,232, and 3,446,321. Other patents which illustrate single revolution type clutches as well as torque limiting clutches include U.S. Pat. Nos. 2,711,237 and 3,712,433.

A power wrench with magnetic sleeves for variable torque output is shown in U.S. Pat. No. 3,974,884, but again this type of device permits rotation of the input shaft relative to the output under a continuous magnetic force.

SUMMARY OF THE INVENTION

The present invention relates to an indexing, single revolution, torque limiting clutch that provides for a less than zero reset torque, or negative torque between the input and output portions tending to urge the clutch to its reset position once the driving torque limit has been exceeded. The rest force reduces the objectionable features of having any friction drag on the clutch between its release position and a reset position. Further, the mechanism provides for an index between the input and output rotational members so that whenever the clutch is driving the shaft will be indexed to a preset relative rotation position. As shown, magnets are used to provide an initial holding force, as well as a spring load.

Specifically, the drive and driven members include a pivoting arm carrying a magnet, which is on one of the rotating members, and a facing magnet extending radially from the other of the rotating clutch members. When the drive is engaged, the drive member is driven in a direction tending to swing the pivoting arm (carried on a first clutch member) against a spring load, and against the magnetic attraction of the two magnets. Once the load carrying capability has been exceeded, that is the arm is swung about its pivot, and the second clutch member rotates relative to the arm on the first member. The spring load continues to urge the arm to act against an annular cam on the second clutch member where the force on the cam tends to rotate the second member and the first member relative to each other toward a reset position where the magnets will again face each other and be engaged under magnetic force.

The device is simple to use, utilizing normal permanent magnet construction.

BRIEF DESCRIPTION OF THE DRAWINGS

FIG. 1 is an exploded view of a torque limiting clutch made according to the present invention with one portion of the clutch removed and parts broken away for sake of clarity;

FIG. 2 is a fragmentary sectional view of the clutch of FIG. 1 taken on line 2—2 showing the clutch rotated slightly from FIG. 1 and in its normal driving position;

FIG. 3 is a side view of the clutch of FIG. 1 showing the clutch after it has been released and is being urged toward its reset position; and FIG. 4 is a sectional view taken generally along line 4—4 in FIG. 3.

DESCRIPTION OF THE PREFERRED EMBODIMENT

The clutch 10 of the present invention is shown in FIG. 1, and includes a first connector hub 11 carrying an outer part cylindrical case portion 12. First hub 11 and case portion 12 form a unitary first member, which can be a drive or driven member, and for convenience and terminology will be called the driven member. The hub 11 has a bore 11A for drivably receiving a drive or driven shaft forming part of a machine on which the clutch is used. A second rotatable member indicated generally at 13 includes a drive disc 14 that is drivably connected to a rotating cam hub 15 (see FIGS. 2 and 3). The disc 14 and cam hub 15 may be integrally formed. The hub 21 and second case portion 20 also are part of the second member 13 and are normally drivably mounted onto disc 14. The hub 15 is rotatably mounted on a mounting stud indicated at 16 (see FIG. 4) that is either threaded into a portion of the bore through the connector hub 11, as indicated at 17, or in some other way nonrotatably and preferably removably attached to the first clutch member.

It can be noted that the case portion 12 has a plate-like wall 12A extending radially from the connector hub 11 and drivably connected thereto and an annular band 12B that is integral with wall 12A. The cam hub 15 and disc 14 may be made of suitable plastic or low friction material, or if desired a suitable bushing may be used for rotationally mounting the cam hub 15 on stud 16. The stud 16 has a head member 16A to retain the disc 14 and cam hub 15 in position along the stud axis. The disc 14 has suitable threaded openings (see FIG. 3) for mounting the second case portion 20 thereon. The case portion 20 has a connector hub 21 drivably attached thereto, which hub has a bore into which a second or drive shaft is drivably connected. The bore 11A and the bore of hub 21 are co-axial.

The case portion 12 has a pivot pin 22 mounted thereon, spaced radially from and extending generally parallel to the axis 24 of the stud 16 and the two clutch portions or members. The pin 22 pivotally mounts a pivoting arm assembly 23 as shown in FIGS. 2, 3 and 4. The arm 23 extends inwardly toward the axis 24 a desired amount. The inner end of the arm 23 carries a permanent magnet 25 which is attached to the arm in a suitable manner and is generally flat and planar. The plane of the magnet 23 extends parallel to the axis 24 in drive or working position of arm 23. This magnet 25 can be any desired permanent type magnet, but the normal hard elastomeric magnets have been found to be suitable for this application. The outer face of the magnet indicated at 25A in FIG. 3 will lie along a radial plane in working or index position of the clutch parts. The cam hub 15, as shown, has a radially extending surface 30 defined thereon that extends from a low cam edge line 27 of an outwardly facing cam surface 26 to an outer or high cam portion of the surface 26. The cam surface 26 is an outwardly facing surface generated around the axis 24. The radially extending driving face surface 30 has a permanent magnet 31 mounted thereon. The magnet 31 is of substantially the same construction as the magnet 25, and when the clutch members are in indexed drive position, the magnets 25 and 31 will be in contact substantially across their entire faces, and the magnetic attraction will hold the two faces of the magnets in contact. A flat plate 28 is also connected to arm 23 on an opposite side of the arm from magnet 25. The plate extends laterally beyond the magnet adjacent to plate 12A of case 12 as shown in FIG. 4 and will engage a stop lug 29 when in working position.

The arm 23 is spring loaded in counterclockwise direction as viewed in FIGS. 2 and 3 through the use of a tension coil spring 32 which is attached at one end to a peg or stud 33 mounted on the wall 12A adjacent the outer perimeter of the case, but on the interior of the case. The second end of spring 32 is attached to an ear on plate 28 that extends laterally out beyond the magnet 31. The spring acts to urge the arm 23 to pivot toward the normal indexed position as shown in FIG. 2. Stop peg 29 thus determines and sets this position. The spring holds the edge of plate 28 and thus arm 23 against the stop peg 29.

Note also that the disc 14 is spaced sufficiently out from wall 12A so that the magnet can pass to the inside of the disc in the places where cam surface 26 is recessed inwardly from the outer peripheral edge of the disc 14.

Assuming that a driving force is being exerted on the disc 14 and cam hub 15 through hub 21 in direction as indicated by the arrow 34 (FIG. 2), that is, in counterclockwise direction as viewed in FIGS. 2 and 3, the engagement of the magnets 25 and 31 will cause the arm 23 to rotate the case 12 and this of course will then rotate the hub 11, and any shaft that is coupled to the interior bore 11A of this hub. Assuming that the resistance to movement of the hub 11 increases, at the breakaway torque level, which is determined by the magnetic attraction between the magnets 31 and 25, as well as a spring force of spring 32, the arm 23 will be forced to pivot clockwise about pin 22. The arm 23 will start to lift up away from the surface of magnet 30. Once the magnets separate (the magnets force is overcome), the clutch has in effect released under this torque and the cam hub 15 will rotate past the arm 23. The arm will be lifted over the high end of the cam surface 26. The inner end of magnet 25 (closest to axis 24) will ride against the outwardly facing cam surface 26 of the cam hub 15 under the spring force of spring 32. Usually there will be some rotational input force continuing to drive hub 21, but assuming that there are no drive forces on either the input or the output clutch members (also called first and second members) it can be seen that because of the cam surface 26 the force from the spring 32 acting on the arm 23 will tend to exert a force to rotate the cam hub 15 in counterclockwise direction. This cam force will overcome any friction and thus the tendency is for the cam hub 15 to rotate slowly until such time as the edge of magnet 25 reaches line 26A on the cam surface. The cam angle increases substantially at this line and a substantial impetus is exerted on the hub 15 tending to snap it around to index position.

Thus there is less than the zero torque for resetting because of the action of the spring 32 and the cam surface 26, particularly after rotating to line 26A. The inertia on the hub 15 and drive member 21 (and any input shaft connected thereto) tends to carry the hub 15 around after release. Thus the steep cam angle is not necessary at the start of the cam. The cam surface 26 extends as a peripheral surface on the hub 15, and the magnet 25 slides along this surface.

The facing magnets provide the primary load carrying capability of the clutch and do not vary substantially in release torque. However, the magnets are not essential. The arm and radial surface form a load carrying arrangement under the spring force only. The magnets however, are not subject to substantial variations in friction coefficients, and yet magnets will go positively to a set or home position. The rotational indexing of the disc 14, hub 15 and associated components will be repeatably indexed with respect to the hub 11 and bore 11A, and any shaft connected to the hubs. Thus the assembly provides a torque limiting, positive resetting, single revolution indexing clutch. Without the magnets the spring would be sufficient to exert the drive force necessary. Also, one magnet can be used if the facing member is magnetic.

The clutch releases more reliably than shear pins, and yet provides accurate indexing between the components such as a shear pin does. When a shear pin shears the pin has to be replaced, while with the present device, once the breakaway torque is exceeded, there will be less than zero torque required for resetting the clutch and it will be ready to drive without further work. The clutch will be urged by the spring pressure and the declining cam surface toward its reset position.

The stop 29 could be made adjustable if desired to permit adjusting the relative indexed position of the two clutch members. The magnet 25 and arm 23 are spaced out from wall 12A sufficiently far so that they clear the inner end of stop peg 29. When arm 23 is pivoted to release the clutch it is lifted away from the stop peg 29 as shown in FIG. 3.

What is claimed is:

1. An indexing overload torque release clutch comprising a rotatable driving member, a rotatable driven member co-axially mounted with said driving member, one of said members comprising a hub rotatably mounted with respect to the other of said members, said hub having an outwardly facing surface generated around said axis comprising a cam surface extending from a first position spaced radially outwardly from said axis a first distance at a first location substantially greater than the radial spacing of said cam surface from said axis at a second location annularly spaced from said first location, a drive surface on said hub generally parallel to the axis and joining the cam surface at said first location and extending inwardly toward said axis, said other member comprising a support extending outwardly from said axis farther than the radial spacing of the cam surface, a pivot member mounted on said support and having a portion extending to engage said drive surface on said hub with the pivot member in a first drive position, magnet means acting to create a magnetic force between said pivot member and said drive surface, and resilient means tending to urge said pivot member to its first drive position, said driven member causing said drive surface and said pivot member to engage and transmit torque to said drive member through the action of said resilient means and said magnet means, and upon exceeding a predetermined amount of torque said magnet means releasing and said pivot member pivoting against the action of said resilient means to a second release position about its pivot to permit the hub to rotate past said pivot member, said resilient means being operable for reset to urge said pivot member against said cam surface to thereby tend to urge said hub to continue to rotate under cam action until the pivot member and drive surface engage.

2. The combination as specified in claim 1 wherein said pivot member and said drive surface of said hub each have separate magnet means thereon, said magnet means normally facing each other with the pivot member in its first drive position.

3. The combination as specified in claim 1 wherein said resilient means comprises a tension spring mounted on the other of said members and being extended upon movement of said pivot member away from its first drive position.

4. The clutch of claim 3 and stop means to prevent said pivot member from pivoting under action of said spring beyond a preselected position.

5. The combination as specified in claim 1 wherein said hub is rotatably mounted on a stud member, said stud member being nonrotatably attached to said other member.

6. The combination as specified in claim 1 wherein said other member includes a housing having a radially extending flange member on which said pivot member is pivotally mounted, and an annular band fixed to said flange and surrounding said hub member.

7. The clutch assembly as claimed in claim 1 wherein said pivot member comprises an arm member, said arm member having said magnet means mounted for movement therewith and said magnet means comprises a flat magnet having a planar face which mates with said drive surface.

8. An indexing clutch having first and second relatively rotatable members at least one of which is adapted for connection to a rotatable machine element, means forming a hub on said first member having an outwardly facing surface generated about the axis of relative rotation of said members, said outwardly facing surface forming a cam surface that varies in radial distance from said axis from a first annular position to a second annular position, a generally radial surface on said hub extending outwardly from a junction with the outwardly facing cam surface substantially at the position of minimum radial distance of said cam surface, an arm pivotally mounted on said second member and positioned to permit said arm to engage said radial surface of said hub in a first arm position bias means for urging said arm to the first arm position, said arm being pivotable against the action of said bias means as the hub is rotated relative to the second member to a second arm position to clear the radial surface, said arm being movable under the action of said bias means to engage the cam surface under a resilient force to provide a cam driving force urging said hub to rotate until the arm again returns to its first arm position and contacts the radial surface.

9. The clutch of claim 8 wherein said arm has a surface contacting said radial surface substantially across its entire face, and magnet means acting to magnetically hold said arm and radial surface in contact.

10. The indexing clutch of claim 8 wherein said second member has a portion extending radially from said axis a radial distance greater than the maximum radial distance of said cam surface, said pivot means including a pivot pin mounted on said portion and spaced radially outwardly from said cam surface, said arm being pivotally mounted on said pivot pin.

11. The indexing clutch of claim 10 wherein said arm extends inwardly toward said axis from the pivot pin in said first arm position, said arm having a width in direction of said axis substantially equal to the width of said cam surface in axial direction.

12. The indexing clutch of claim 11 and stop means on said second member to limit the pivotal movement of said arm in the pivot direction of bias load on said arm.

13. The clutch of claim 8 wherein said bias means comprises a spring.

* * * * *

UNITED STATES PATENT OFFICE
CERTIFICATE OF CORRECTION

Patent No. 4,271,944                    Dated June 9, 1981

Inventor(s) Douglas R. Hanson

It is certified that error appears in the above-identified patent and that said Letters Patent are hereby corrected as shown below:

Column 6, line 13, (Claim 8, line 15), after "position" insert a comma --,--.

Signed and Sealed this

First Day of September 1981

[SEAL]

Attest:

Attesting Officer

GERALD J. MOSSINGHOFF

Commissioner of Patents and Trademarks